Jan. 23, 1962  F. W. HICKS, JR  3,017,901
VALVE ASSEMBLY
Filed June 15, 1959  4 Sheets-Sheet 1
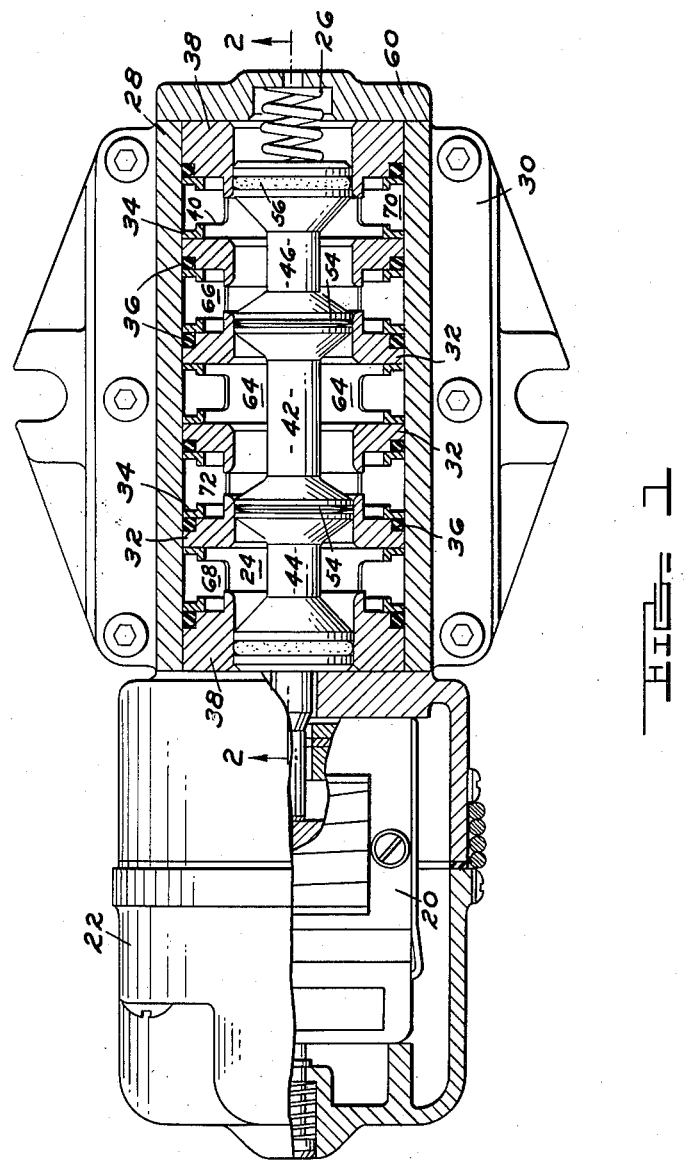
INVENTOR.
FREDERICK W. HICKS, JR.
BY
Burton & Parker
ATTORNEYS

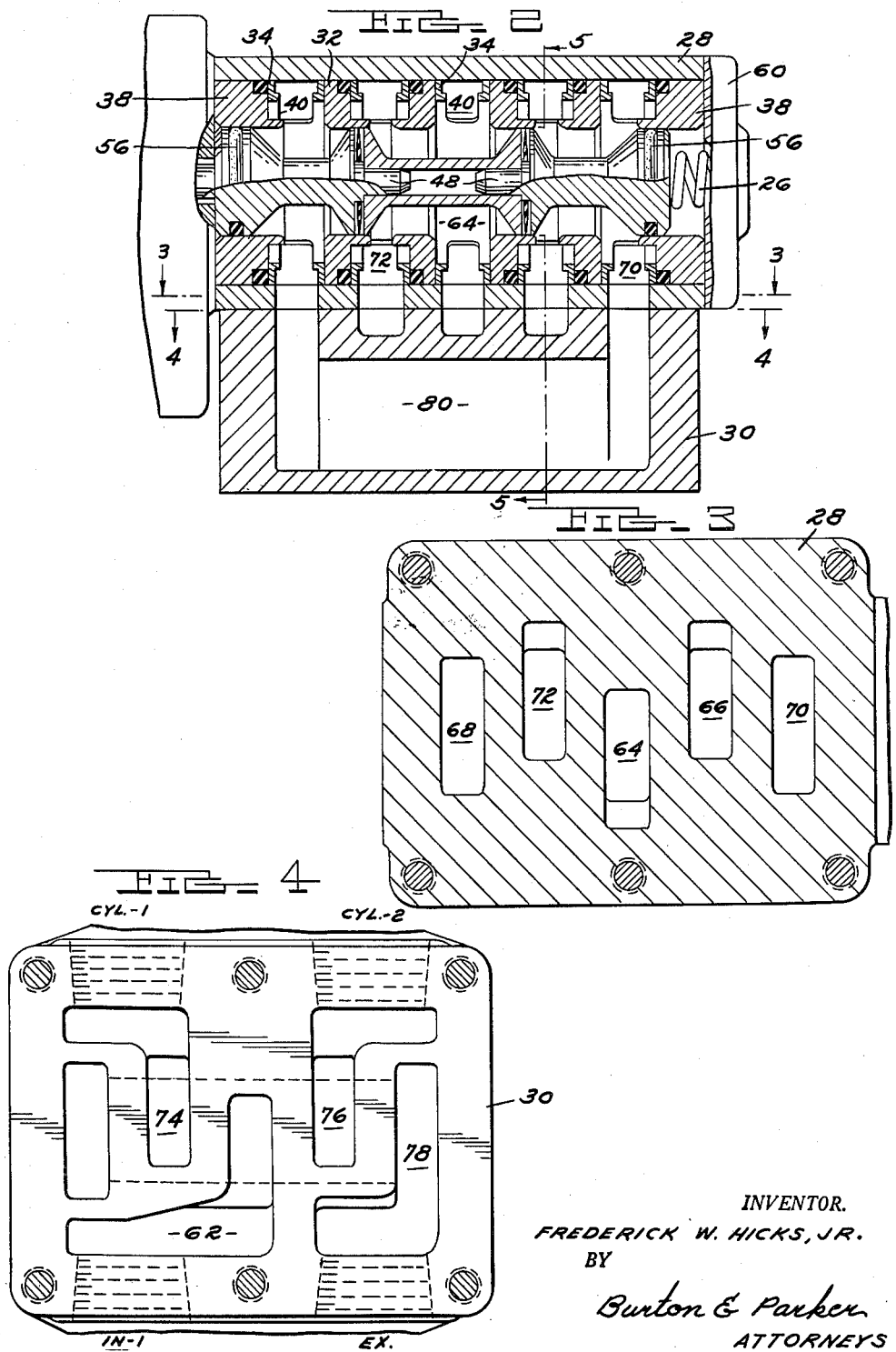

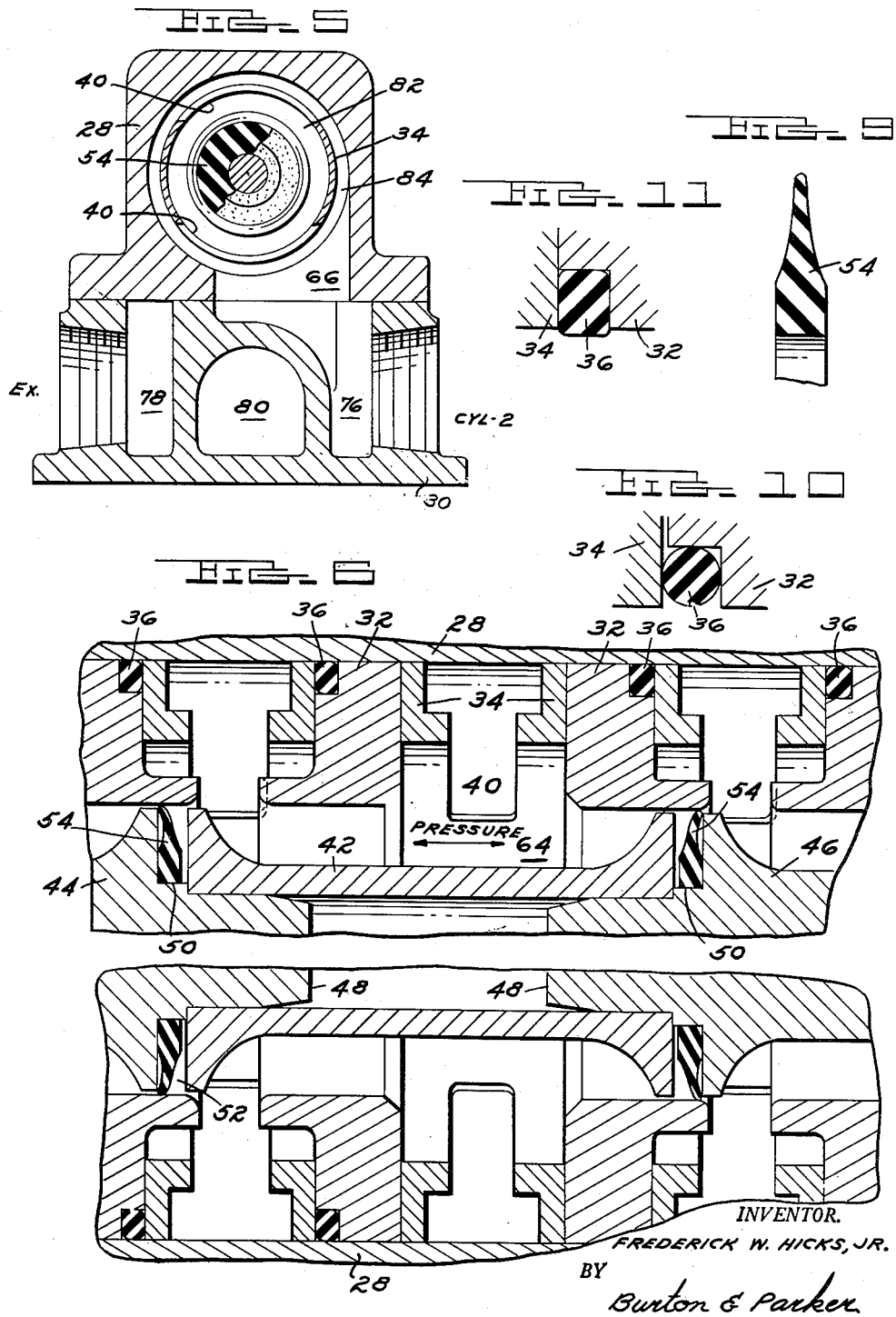

INVENTOR.
FREDERICK W. HICKS, JR.
BY
Burton & Parker
ATTORNEYS

United States Patent Office 3,017,901
Patented Jan. 23, 1962

3,017,901
VALVE ASSEMBLY
Frederick W. Hicks, Jr., Detroit, Mich., assignor to Air Valves Company, Warren, Mich., a corporation of Michigan
Filed June 15, 1959, Ser. No. 820,167
10 Claims. (Cl. 137—622)

This invention relates to an improved valve assembly.

An object of this invention is the provision of an improved valve structure suitable to be embodied in a multi-ported air valve construction which provides an effective seal about the valve openings and which requires a minimum amount of power to operate the same and to break the same loose for functioning after it has been standing idle for relatively long periods of time, as over weekends or the like.

Another object is the provision of a valve structure of the character described wherein the frictional characteristics of the association of the valve sealing elements with the valve seats are so substantially reduced that the power which is required to normally operate the valve is sufficient to break it out for use after protracted periods of idleness.

Normally a multi-ported spool valve of a character generally similar to that herein disclosed can be operated efficiently by a solenoid of substantially less capacity than that which may be required to break the valve loose after it has stood idle for a protracted period because the breakout pressure required to overcome the frictional resistance is normally substantially greater than that required to overcome the frictional resistance of running operation of the valve. Such is so well understood that it is common practice on Monday morning to manually mechanically break out valve structures used on machines which have stood idle over the weekend. Normally, for purposes of economy and long life, only small power solenoids having sufficient power to operate the valves during running, are employed with such halves.

A meritorious feature of this invention, therefore, is that the frictional characteristics are so controlled by the construction, disposition, and assembly of valve sealing elements carried by the reciprocating spool structure and traveling over the valve seats within the valve body that only a minimum amount of frictional characteristic is required to provide an effective seal for operation.

Another object is the provision of a valve of the character described wherein the component parts are so associated together as to facilitate replacement of individual parts.

A meritorious feature is the provision of a valve as described wherein the component parts are so assembled together as to ensure desirable alignment thereof within the valve assembly and such parts suitably divide the interior of the valve body into separate leak-proof valve chambers.

More particularly an object is the provision of a valve sealing element which is so constructed and associated with other parts of a valve spool assembly and valve seating means within the valve body as to maintain effective sealing engagement at all times with a minimum amount of frictional resistance to valve functioning.

A further meritorious feature is the provision of a valve spool assembly including sealing elements carried thereby and wherein the component parts are so assembled together and so formed that the valve sealing elements may be configured to form line contact with the valve seating elements within the valve body, and such valve sealing elements are so supported within the valve spool assembly that a minimum amount of power is required to actuate the valve spool assembly while maintaining air-tight contact of the sealing elements with the seating elements.

Other objects, advantages, and meritorious features of the invention will more fully appear from the following description, claims, and accompanying drawings wherein:

FIG. 1 is a horizontal sectional view along the center line through a typical four-way valve construction embodying my invention and including a base for the valve body and a valve actuating solenoid and housing assembly secured to one end of the valve body;

FIG. 2 is a vertical sectional view taken on the line 2—2 of FIG. 1 through the valve body and base but with the solenoid housing assembly being broken away, the structure being shown in the idle position and without air pressure thereupon;

FIG. 3 is a horizontal sectional view taken through the valve body facing downwardly and along line 3—3 of FIG. 2;

FIG. 4 is a top plan view of the valve body base showing fluid passageways therethrough and taken on the line 4—4 of FIG. 2;

FIG. 5 is a vertical sectional view taken on line 5—5 of FIG. 2 through the valve body, spacer, valve spool assembly, and valve body base;

FIG. 6 is an enlarged broken away sectional view along the center line through the construction shown in FIG. 2 showing the position of the valve seals with the solenoid de-energized but with air pressure on and acting upon the valve seals;

FIG. 7 is a broken away, somewhat diagrammatic, sectional view taken on a line similar to that of FIG. 6 but showing the response of the valve seals to the initiation of movement of the valve spool assembly to the right under the action of the solenoid, and with the air pressure being on;

FIG. 8 is a broken away, somewhat diagrammatic, sectional view similar to that shown in FIG. 7 but showing the position of the valve seals at the end of the stroke of the valve spool assembly to the right under the action of the solenoid, the air pressure being on;

FIG. 9 is an enlarged broken away radial sectional view through a valve sealing element showing the configuration thereof in the relaxed state;

FIG. 10 is an enlarged fragmentary sectional view showing the relative position of a valve seat, O-ring, and spacer, as the same would be disposed within the valve body prior to tightening together of the component parts within the body;

FIG. 11 is a sectional view through a fragment of the same structure as shown in FIG. 10 but showing the relative position of the same component parts tightened together within the valve body.

Figure 7:
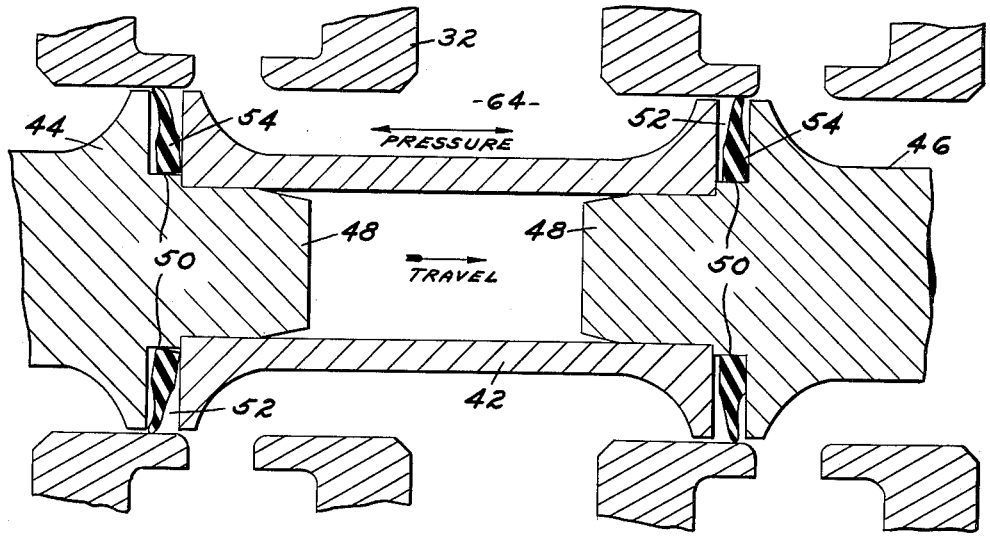

My invention is shown in the drawings as embodying a four-way valve structure but it is to be understood that such is merely exemplary for the invention might be embodied in other multi-ported valve forms. The inventive concept relates primarily to the character of the valve sealing elements and their association and/or mounting as parts of the reciprocable valve spool assembly, and to the character and relative arrangement of the component parts of the valve spool assembly, including the valve sealing elements, and, secondarily, to the interior of the valve body structure including the mounting of the valve seating and guiding elements within the body.

My improved valve mechanism is here shown as provided with a suitable solenoid 20 disposed within a solenoid housing 22. The solenoid housing is connected with the valve body and the solenoid is connected with the operable valve mechanism in such a manner that the solenoid actuates the valve spool assembly 24 axially in one direction within the body and counter a spring element 26, which spring returns the spool assembly in the opposite direction. This invention, however, does not concern itself with the solenoid or with its operating connection with the valve. Other power actuating mechanisms might be provided and the valve spool assembly might be power-actuated in both directions without the intervention of a spring and such constitutes no part of the invention.

The valve body 28 shown particularly in FIGS. 1, 2, and 5, may be formed of suitable metal and mounted upon a suitable base 30. The valve body is provided with chambers and passageways which communicate with passageways through the base including inlet, exhaust ports, and cylinder connections, all as hereinafter described.

The valve body 28 is provided interiorly with replaceable annular valve seats 32, four being here shown. Such valve seats are spaced apart by annular outwardly opening channel-shaped spacer elements 34. These seats and spacer elements are disposed within the interior of the valve body as shown particularly in FIGS. 1, 2, and 6. The valve seats 32 are made air tight within the valve body by encircling O-rings 36 interposed between the seats and the body as hereinafter more specifically set forth. At opposite ends within the valve body are annular valve stem guides 38. Each of these annular valve stem guides is provided with an encircling O-ring 36 similar to the O-rings 36 which encircle the valve seats 32 and which similarly provide a tight seal about the guides within the valve body. The valve seat spacers, which are channel-shaped in cross section, are provided with diametrically disposed passageways 40 through the bottom of the channel shapes as shown in FIGS. 1, 2, and 5 for the flow of air under pressure through such passageways.

The spool assembly 24 is supported for reciprocation within the interior of the valve body by the valve guides 38 shown in FIGS. 1 and 2. Such valve spool assembly comprises a plurality of spoollike elements or components detachably, telescopically fitted together so as to reciprocate as a spool unit within the valve body. This is shown more particularly in FIGS. 1, 2, 6, and 7. The intermediate or center spool component is indicated as 42. The spool component at the solenoid end is indicated as 44 and the spool component at the spring end of the assembly is indicated as 46. These three spool components with the sealing elements and O-rings mounted on the spool components constitute the spool assembly.

The two end spools 44 and 46 have projecting end portions 48 at their inner ends which form tight press fits within the axial passageway through the intermediate spool 42, as shown in FIGS. 2 and 6. These end spools are separate from the center spool but connected thereto. The two end spools are also provided on their inner ends with shoulders 50. These shoulders provide, between the intermediate spool and the adjacent ends of the two end spools, a space or channel 52. Within these channels 52 are mounted sealing elements 54.

Figure 8:
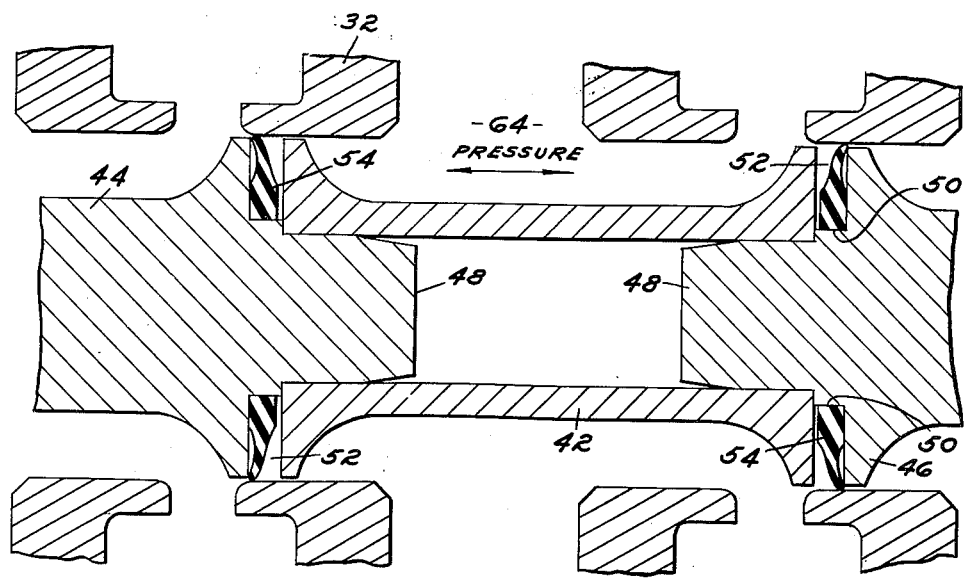

These sealing elements 54, which may be formed of suitable synthetic rubber-like materials, are of less axial maximum dimension than the width of the channels 52 within which they are seated. Such sealing elements are therefore free to shift axially or tilt within these channels as shown in FIGS. 6, 7, and 8. The base of the sealing element 54 may have an axial thickness of .068" and the axial dimension of the groove 52 may be .072". Such has been found suitable with certain valve sizes. The axial width of the channel 52 is controlled by the dimension of the shoulder 50 upon the end spool. It is important that the sealing elements 54 be permitted this freedom of movement within the channels 52.

Buna "N" rubber is one synthetic which has been found suitable for the sealing elements 54. Such sealing elements should be formed of material which is impervious to the action of any fluids with which such may come in contact. They should be of a material which will not expand or contract undesirably in use.

The configuration of one of the sealing elements is shown in FIG. 9. It is in the form of an annulus having an inner diameter sufficient to be freely received over a shoulder 50 of an end spool 44 or 46 as illustrated. The axial portion of the sealing element is sufficiently heavy to prevent undue radial expansion of the sealing element. The peripheral portion of the sealing element is in the form of a relatively thin lip. Preferably it may have tapered somewhat concave opposite sides as shown particularly in FIG. 9. Its margin may be formed on a radius to establish line contact against the wall of the valve seat.

FIG. 6 shows the valve spool assembly to the left and as illustrated in FIGS. 1 and 2. In FIG. 6, however, unlike FIGS. 1 and 2, the air pressure is on. The double-headed arrow in FIG. 6 indicates air pressure within the space indicated. As is apparent from FIG. 6, the air pressure within the space 64 about the center spool 42 has deflected or upset in opposite directions the peripheral lip portions of the sealing elements 54 in the manner indicated. The thin outer edge portion of each sealing element has been deformed outwardly and forms an effective seal against air flow past the seals.

When the solenoid 20 is energized, its plunger moves the valve spool assembly to the right. During the initial stage of such movement to the right, the seals are believed to assume the configuration shown in FIG. 7. The single-headed arrow in FIG. 7 shows the direction of solenoid movement of the spool assembly. The double-headed arrow in FIG. 7 indicates the action of the air pressure upon the seals. The extent of clearance of the spools themselves within the bore of the valve body is exaggerated in FIG. 7 for purposes of clearness.

It is believed that the valve sealing element 54 at the right in FIG. 7 under the initiation of movement of the spool assembly to the right by the solenoid has started to right itself and assume a normal upright undeflected position. The base of the sealing element has not shifted within the groove. The seal itself has offered very little or light resistance to this movement of the spool assembly to the right. It is also believed that the valve sealing element at the left has started to roll its outer thin lip margin into the concave space previously noted at the left of the sealing element in FIG. 6. At the same time it is believed that the heavy base portion of this sealing element 54 has shifted and tilted laterally within the channel 52 as indicated in FIG. 7. Such movement could be likened to a diaphragm action that reduces the outer diameter of the seal.

FIG. 8 shows the spool valve assembly shifted completely to the right and the seals engaged with the opposite valve seats from those with which they were engaged as shown in FIG. 7. It will be noted that the seals have now assumed the same configuration shown in FIG. 6 but in engagement with the opposite valve seats. The air pressure has flexed the marginal lips of the seals outwardly and the base portions of the seals are held in the same direction within the channels 52.

This de-energization of the solenoid permits return spring 26 to return the spool valve assembly to the left to the original position as shown in FIG. 6 with the seals performing in reverse the action hereinabove described and leaving the seals in position as shown in FIG. 6.

Dimensions are so held that the thin peripheral margins of the seals establish substantially a line to line contact against the valve seats 32, thereby reducing the frictional engagement to a very light one. Such thin marginal portions of the seals possess sufficient flexibility to deflect or roll upon themselves. A proper relationship between the thin marginal portion of the seal as compared with the relatively heavy axial portion of the seal is desirable. Such relationship depends upon the character of the valve assembly, the size of the valve chambers, the diameters of the seals, etc. As heretofore stated, it is also desirable to permit the seals to shift within the channels 52. The seals function best when these optimum conditions prevail.

The outer ends of the end spools 44 and 46 are provided with O-rings 56 as shown in FIG. 2 to form a tight seal within the guides 38. It was hereinabove stated that the valve body was provided interiorly with annular valve seats 32, each of which was encircled by a suitable O-ring 36 as shown in FIG. 1. When the component parts, i.e., the valve seats 32, the valve spacers 34, the valve spool guides 38 including their O-rings 36, are all assembled within the valve body 28, the O-rings would normally occupy their natural shape shown in FIG. 10.

It is understood that the solenoid housing 22 is secured to one end of the valve body closing the same, as shown in FIG. 1. When the end cap 60 is secured to the opposite end of the valve body as shown in FIGS. 1 and 2, the valve seats and valve seat spacers 34 are urged or compressed together as shown in FIG. 11, bringing the spacers and valve seats into abutment. This action results in deforming the O-rings 36 so that they are forced to take the shape substantially shown in FIG. 11. In such shape they form fluid-tight contact with the valve body. The normal clearance of the spool assembly within the valve body (not counting the O-rings) might be .003". When the static O-rings are compressed as described, by securing the cap 60 to the valve body, the O-rings are deformed as shown in FIG. 11, being forced against the wall of the valve body forming an effective fluid-tight seal therewith and dividing the body into a plurality of compartments that are alternately subjected to fluid pressure.

In operation, fluid, such as air, enters under pressure at the port marked "In" in FIG. 4. This fluid flows by way of passageway 62, FIG. 4, to passageway 64 indicated in FIG. 3, and also in FIGS. 1 and 2. Such fluid brings pressure to bear in opposite directions upon the valve seals 54 as shown particularly in FIG. 6. These valve seals 54 prevent fluid flow to passages 66, 68, and 70 in FIGS. 3, 2, and 1. Pressure can flow, however, to passageway 72 shown in FIGS. 1, 2, and 3, and thence to passageway 74, shown in FIG. 4, and out through port CY-1 shown in FIG. 4, which port CY-1 is disposed in the valve base 30.

At the same time any fluid contained under pressure as, for example, in a double-acting cylinder, can return to exhaust through port CY-2, FIG. 4. It returns by way of passageway 76, FIG. 4, which connects to passage 66, thence to passage 70, FIG. 3, thence to passage 78, FIG. 4, to exhaust through opening EX to the atmosphere.

When the valve stem assembly 24 is urged to the right through action of the solenoid, the valve seals 54 are moved to engage the opposed valve seats as shown in FIG. 8. The flow pattern is then reversed. Fluid pressure enters at the in port and flows by way of passageway 62, FIG. 4, to passageway 64, FIG. 3, to passageway 66, FIG. 3, to passageway 76, FIG. 4, to cylinder port CY-2. The fluid pressure that might be contained, as, for example, in a double-acting cylinder, can then flow through the support C-1 by way of passageway 74, FIG. 4, and passageways 72 and 68, FIG. 3, and by way of lengthwise passageway 80, FIG. 2, to passageway 78, and thence to exhaust through opening EX to the atmosphere.

It should also be noted, as shown in FIG. 5, that the air pressure can flow in either direction through spacers 34 by passing through the passageways 40 machined through the bottom of the spacer. Thereby, fluid pressure may flow freely from passage 82 around the valve stem through annular passage 84 thus communicating with the several openings 64, 66, 68 70, and 72, indicated in FIGS. 1, 2, and 3.

What I claim is:

1. A valve structure comprising a body having an interior chamber provided with an annular valve seat, a valve stem assembly supported for reciprocation within the chamber through the valve seat, said valve stem assembly including a resilient annular valve seating element shiftable therewith through the valve seat, said sealing element having an external diameter greater than the internal diameter of the valve seat and having a marginal portion resistingly flexible to travel through and over the valve seat and form fluid-tight contact therewith, said valve stem assembly characterized in that it includes an axial portion and two radially projecting axially spaced-apart valve seal supporting portions defining therebetween a channel encircling said axial portion, and further characterized in that the valve seal is supported upon said axial portion within said channel and has an axial base portion of substantially greater thickness than the marginal portion of the seal and said marginal portion of the seal tapers from the base portion toward the periphery of the marginal portion and the base portion of the seal has an axial dimension less than the axial dimension of the channel whereby the seal has limited axial shiftable movement within the channel.

2. A valve structure having a body provided with an interior chamber having two opposed annular valve seat elements removably supported in axial alignment within the chamber, an annular spacer element channel shaped in cross section removably supported within the chamber between said valve seats axially spacing the seats apart, a valve spool assembly supported within the chamber for reciprocation axially through said valve seats, said spool assembly comprising: a plurality of spools telescopically coupled together in axial alignment with one spool having its opposite ends spaced axially from the adjacent ends of the adjacent spools forming valve seal receiving channels between the spools encircling the axis of the spool assembly, a valve seal mounted within each of said channels in fluid-tight contact upon an axial portion of the spool assembly, said valve seal having an external diameter greater than the external diameter of the ends of the spools between which it is positioned and greater than the internal diameter of the valve seat within the chamber through which it travels, said valve seal being formed of resilient material and having a thin marginal portion adapted to resistingly flex to permit the seal to travel through and over a valve seat and form fluid-tight contact therewith.

3. A valve structure as defined in claim 2 characterized in that the valve seal is in the form of an annular disc of compressible resilient material and having a thin marginal portion carried by a relatively heavy axial base portion, said base portion having an axial thickness less than the axial dimension of the channel within which the seal is disposed permitting limited shiftable movement of the seal within the channel.

4. A valve structure having a body provided with an interior chamber having two pairs of opposed valve seat elements removably mounted within the chamber, an annular valve spacer removably disposed within the chamber between said two paris of seat elements and an annular valve spacer removably disposed within the chamber between the two seat elements of each pair spacing such seat elements apart axially within the chamber, an annular end guide removably disposed within each end of the chamber axially aligned with the valve seat elements and spaced therefrom by an annular spacer removably disposed within the chamber between each guide and the adjacent valve seat element, a spool assembly mounted within the chamber supported by said end guides for reciprocation through the seat elements, said spool assembly comprising a plurality of spools telescopically coupled together in axial alignment, at least one of said spools having its opposite ends coupled with adjacent spools being spaced axially therefrom by an axial portion interposed therebetween forming an annular channel at each end of said one spool which channel encircles the axial portion of such end of the spool, a valve sealing disc at each end of said one spool mounted upon said axial portion within the channel and encircling said axial portion, each disc having a maximum axial dimension at its center less than the axial dimension of its channel and having a limited shiftable movement within the channel, each disc having an external diameter greater than the internal diameter of the pair of valve seating elements through which the disc is adapted to be moved, each disc having a thin flexible marginal portion resistingly yieldable to permit the disc being moved axially into each valve seat and forming a fluid-tight sealing engagement with the seat during such movement.

5. A valve structure as defined in claim 4 characterized in that each valve seat and each end guide is provided with a circumferential recess adjacent to a spacer element and a compressible O-ring having a normal diameter in excess of the axial dimension of said recess is seated within each of said recesses, means at opposite ends of the chamber secured to the body imposing axial pressure upon opposite end guides urging said end guides, spacer elements, and valve seats together within the chamber compressing the O-rings and deforming the same radially into tight sealing engagement with the chamber within the body.

6. In a valve structure, a valve seal in the form of an annular disc of flexible fluid-tight sealing material having an axial base portion provided with an axial opening therethrough, said base portion having a radially projecting marginal portion which is disposed substantially midway between opposite sides of the base portion and which is relatively thin as compared with the thickness of the base and which tapers from both sides toward the perimeter of the marginal portion.

7. In a valve structure, a valve seal in the form of an annular disc of flexible fluid-tight sealing material having an axial base portion provided with an axial opening therethrough, said base portion having a radially projecting marginal portion which is relatively thin as compared with the thickness of the base and which tapers toward the perimeter of the marginal portion, the opposite sides of the marginal portion of the disc beyond the base being oppositely concave, said disc having an arcuate edge.

8. A valve structure comprising a body provided with an interior chamber having two opposed annular axially spaced-apart valve seats, a valve spool assembly supported within the chamber for reciprocation therethrough and through said valve seats, said assembly comprising a plurality of separable spools coupled together in end to end alignment and having adjacent ends of adjacent spools so spaced apart in such alignment as to provide an axially spaced-apart valve seal receiving channel between adjacent ends of adjacent spools, said channels encircling the axis of the spool assembly, an annular valve seal mounted within each of said two channels in fluid-tight engagement upon an axial portion of the spool assembly, each valve seal projecting radially beyond the ends of adjacent spools which constitute the sides of the channel within which the seal is disposed and having an external diameter greater than the internal diameter of an annular valve seat for the valve seal and having a resilient marginal portion resistingly flexible to travel over and pass through an annular valve seat and form fluid-tight contact therewith, said valve spool assembly characterized in that each annular valve seal has a base portion seated within the bottom of the seal-receiving channel and has its marginal portion projecting radially as a lip outwardly away from said base portion, said lip having a thickness at its margin substantially less than the thickness of the base of the seal but greater than the radial gap between the ends of the spools which constitute opposite sides of the channel within which the seal is seated and the annular valve seat through which the valve is adapted to be moved.

9. A valve structure comprising a body provided with an interior chamber having two opposed annular axially spaced apart valve seats, a valve spool assembly supported within the chamber for reciprocation therethrough and through said valve seats, said assembly comprising a plurality of separable spools coupled together in end to end alignment and having adjacent ends of adjacent spools so spaced apart in such alignment as to provide an axially spaced-apart valve seal receiving channel between adjacent ends of adjacent spools, said channels encircling the axis of the spool assembly, an annular valve seal mounted within each of two channels in fluid-tight engagement upon an axial portion of the spool assembly, each valve seal projecting radially beyond the ends of adjacent spools which constitute the sides of the channel within which the seal is disposed and having an external diameter greater than the internal diameter of an annular valve seat for the valve seal and having a resilient marginal portion resistingly flexible to travel over and pass through an annular valve seat and form fluid-tight contact therewith, said valve spool assembly characterized in that each annular valve seal has a base portion seated within the bottom of the seal-receiving channel and has its marginal portion projecting radially as a lip outwardly away from said base portion, said lip having a thickness at its margin substantially less than the thickness of the base of the seal but greater than the radial gap between the ends of the spools which constitute opposite sides of the channel within which the seal is seated and the annular valve seat through which the valve is adapted to be moved, and further characterized in that said lip is tapered outwardly on both sides from its base to its margin and is disposed spaced from adjacent ends of adjacent spools which constitute opposite sides of the seal-receiving channel when the lip is not under pressure of deflection.

10. A valve structure as defined in claim 6 characterized in that the valve seal is disposed within an annular valve seal-receiving channel which encircles the axis of a reciprocal valve stem and which channel has an axial width adjacent to its bottom sufficiently in excess of the width of the axial base of the valve seal to permit axially shiftable movement of the seal within the channel.

References Cited in the file of this patent

UNITED STATES PATENTS

| | | |
|---|---|---|
| 1,381,315 | Laussuco | June 14, 1921 |
| 1,704,759 | Miller | Mar. 12, 1929 |
| 2,349,170 | Jackman | May 16, 1944 |
| 2,585,556 | Johnson | Feb. 12, 1952 |
| 2,638,923 | Paget | May 19, 1953 |
| 2,653,580 | Moore | Sept. 29, 1953 |
| 2,713,989 | Bryant | July 26, 1955 |
| 2,920,650 | Moog | Jan. 12, 1960 |